ns and nitroalkanols have many uses.
United States Patent Office 3,377,387
Patented Apr. 9, 1968

3,377,387
PROCESS FOR PREPARING NITRO COMPOUNDS BY REACTING ORGANIC AMINES WITH OZONE
Gustave Bryant Bachman, Lafayette, Ind., and Kenneth G. Strawn, South Charleston, W. Va., assignors to Purdue Research Foundation, Lafayette, Ind., a corporation of Indiana
No Drawing. Filed Dec. 1, 1966, Ser. No. 598,204
15 Claims. (Cl. 260—632)

This invention relates to the production of nitrohydrocarbons. In a particular aspect it relates to the production of nitrohydrocarbons by the oxidation by ozone of certain organic nitrogen compounds having an oxidizable nitrogen atom.

Nitrohydrocarbo
The nitroalkanes are useful as solvents, pigment-wetting agents, evaporation retarders and fugitive plasticizers. Nitroalkanols are useful as fungicides and as intermediates for the preparation of esters which are good plasticizers for nitrocellulose. Nitro-aromatics, e.g., nitrobenzene, nitrotoluene and nitronaphthylene, have many known uses.

Several processes are available for the production of nitroalkanes. The reaction of V. Meyer and O. Stuber, Ber. 5, 203–5 (1872) is probably the oldest and most selective. According to this reaction, an alkyl halide is reacted with a metal nitrite, e.g., silver nitrite, to form a nitroalkane. Nitroaromatics are commonly prepared by treating an aromatic hydrocarbon with a nitric acid-sulfuric acid mixture in the liquid phase. This process has also been useful for nitration of aliphatic hydrocarbons having from 5 to about 20 carbon atoms, but a multiplicity of products is obtained unless the starting hydrocarbon is quite pure. At best, however, this process gives poor yields so that the resulting purified nitroalkanes are quite expensive and are thus barred from uses where they have technical value.

Vapor phase nitration of propane has been particularly successful for the production of 1- and 2-nitropropane, nitroethane, and nitromethane, the latter two compounds occurring as a result of cracking the propane molecule. However, vapor-phase nitration of butane yields a mixture difficult to separate because of the large number of components resulting from formation of isomers, cracking and rearrangement; nitration of the higher aliphatic hydrocarbons gives very complex mixtures.

It has long been known that primary amines can be oxidized directly to nitrohydrocarbons. Various oxidizing agents such as hydrogen peroxide and potassium permanganate have been successfully employed. Oxidation of amino alcohols has not been satisfactory, however, because the alcohol group is oxidized to the carboxylic acid. Nitrohydrocarbons prepared by this process have never reached the market in volume, probably due to the expense involved.

Because ozone can be readily generated from oxygen, which is commercially available in large quantities, it is a useful oxidizing agent. However, several workers, viz L. Long, Jr., Chem. Rev., 27, 437 (1940); P. S. Bailey, Ibid, 58, 925 (1958); F. P. Florentine, Jr., U.S. Patent 2,793,221; H. Otsuki and H. Funahashi, Japanese Patent 4117 (1956), attempted to prepare nitroalkanes by oxidation of primary amines but reported unsatisfactory results.

It is an object of this invention to provide a process for the production of nitrohydrocarbons.

It is another object of this invention to provide a process for the production of nitrohydrocarbons by the oxidation by ozone of certain organic nitrogen compounds having an oxidizable nitrogen atom.

Other objects of this invention will be apparent to those skilled in the art from the description herein.

A process has now been discovered whereby nitrohydrocarbons are produced by the oxidation by ozone of certain organic nitrogen compounds having an oxidizable nitrogen atom. The organic nitrogen compounds of this invention correspond to the following structural formula:

wherein R is alkyl, hydroxyalkyl, aryl including substituted aryl, or aralkyl, having from 1 to 22 carbon atoms; $R^1$ and $R^2$ can be hydrogen, or $R^2$ can be hydroxyl, or $R^1$ and $R^2$ taken together can be the radical

wherein $R^3$ is an alkyl group of from 1 to 21 carbon atoms. The $R^3$ groups can be the same or they can be different.

When the organic nitrogen compound is a substituted amine, e.g., hydroxy substituted, the product is a substituted nitrohydrocarbon, e.g., a nitrohydroxy hydrocarbon. Generally, the reaction is conducted at a temperature within the range of from −80° C. to somewhat above ambient temperatures, e.g., 45° C.

It is convenient, but not necessary to conduct the reaction in the presence of a solvent. The use of a solvent has the advantage of reducing the liklihood of a very high reaction rate which could become explosive. The nitrohydrocarbon or substituted nitrohydrocarbon is conveniently recovered by distilling off the more volatile solvent, if one is used, and then, if desired, purifying the nitrohydrocarbon by any suitable means. Nitroalkanes and nitroaromatics can be purified by fractional distillation, but many nitroalkanols are thermally unstable and are preferably purified by recrystallization or other suitable means, several of which are known. The process of this invention is suitable for the production of nitroalkanes, substituted nitroalkanes, e.g., nitroalkanols, nitroaromatics and substituted nitroaromatics.

The organic nitrogen compounds having an oxidizable nitrogen atom include primary amines, alkylhydroxylamines, cycloalkylhydroxylamines, and ketimines. Generally, these compounds should be relatively pure to avoid side reactions which might lead to mixtures difficult to separate.

The amines which can be employed in the practice of this invention include aliphatic and aromatic primary amines, including substituted amines, e.g., alkanolamines, corresponding to the general structural formula wherein $R^1$ and $R^2$ are hydrogen. Such primary amines include, but are not limited to primary alkylamines having from 1 to 22 carbon atoms, e.g., methylamine, ethylamine, propylamines, butylamines, octylamine, decylamine, and higher primary alkylamines; primary alkanolamines, e.g., ethanolamine, the propanolamines, including polyhydroxypropylamines, and the butanolamines including polyhydroxybutylamines; and primary aromatic amines, e.g., aniline, o-toluidine and α-naphthylamine.

The alkylhydroxylamines which can be employed in the practice of this invention correspond to the general structural formula wherein R is an alkyl or aryl radical, including aralkyl, having from 1 to 22 carbon atoms, $R^1$ is hydrogen and $R^2$ is hydroxyl, and include, but are not limited to methyl, ethyl, isopropyl, cyclohexyl, decyl, and dodecylhydroxylamines. The arylhydroxylamines which can be used in the practice of this invention include, but are not limited to phenylhydroxylamine, tolylhydroxylamine and xylylhydroxylamine.

The ketimines useful for the practice of this invention correspond to the formula

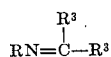

where R is alkyl, hydroxyalkyl, aryl including substituted aryl or aralkyl having from 1 to about 22 carbon atoms; $R^3$ is an alkyl group of from 1 to 21 carbon atoms.

In general, the process is conducted in a reaction vessel at a temperature of from −80° C. to about 45° C. As a safety precaution, it is preferred to condut the reaction in a frigid zone below about 0° C. to prevent a very high reaction rate which could become explosive. A convenient frigid zone can be provided in the laboratory by immersing the reaction vessel, partially or wholly, in a Dry Ice-acetone bath, which has a temperature of about −78° C. A frigid zone can also be provided by means of a refrigerated reaction vessel as is known in the art.

The reaction vessel is fitted with an inlet means for ozone. Preferably, the ozone is introduced beneath the surface of the liquid, as for example, through a sparger or through a fritted glass bubbler. An outlet means is also provided to permit escape of unreacted oxygen. The outlet means is fitted with a wash bottle containing 2% aqueous potassium iodide solution which in turn is connected with a wet test meter. Ozone is passed through the empty apparatus to set the rate of flow with the aid of the wet test meter and to determine the ozone concentration by titration of the oxidized potassium iodide with standardized thiosulfate solution as is known. The concentration of ozone in the gas stream was usually about 0.003 mole/l.

The amine is preferably dissolved in a large excess of inert solvent and the solution is transferred to the reaction vessel. Fresh potassium iodide solution is introduced into the wash bottle. Ozone is then passed into the solution until the reaction is complete. The end of the reaction can be determined (1) by measuring the passage of a predetermined amount of ozone, (2) the appearance of a blue color in the reaction vessel indicating excess ozone, or (3) the turning brown of the contents of the wash bottle.

The ozone can be provided by any satisfactory means. A convenient method is to provide it from an oxygen supplied from a commercial cylinder using a Welsbach Ozonator Model T–23 ozone generator, manufactured by the Welsbach Corporation, Philadelphia, Pa. The oxygen is dried before delivery to the ozonator. A convenient method of drying the oxygen is to pass it through a trap containing potassium hydroxide and thence through a tower packed with anhydrous calcium sulfate and potassium hydroxide. It is then delivered to the ozone generator.

Any solvent which is inert to the organic nitrogen compound and to ozone can be used provided it remains liquid at the reaction temperature. Satisfactory solvents include, but are not limited to methylene chloride, ethyl acetate, chloroform, carbon tetrachloride, petroleum ether (35–37°), and ethyl ether. Methanol has been used satisfactorily in spite of its tendency to react with ozone.

In conducting the reaction, ozone is passed into the reaction mixture until the blue color of excess ozone appears in the reaction mixture. If the reaction is conducted in an opaque vessel, the ozone should be added to provide approximately 1–5, preferably 2 to 4 moles of ozone per mole of amine. The ozone generator is then shut down, the reaction mixture is removed from the frigid zone and is allowed to come to room temperature. The product is dried, e.g., over anhydrous magnesium sulfate, the solvent is partially evaporated, and the product is purified by any suitable means, e.g., by recrystallization if a solid or by distillation if liquid.

The following examples illustrate the process of this invention but it is not intended that they be construed as limitations thereof.

Example 1.—Preparation of 1-nitrobutane from N-isopropylidenebutylamine

Freshly distilled N-isopropylidenebutylamine (5 g., 0.0443 mole) was added to anhydrous methylene chloride (75 g.), and the solution placed in a reaction flask consisting of a cylindrical glass vessel fitted with a gas inlet and exhaust fixture. The temperature was maintained at −78° C. by a Dry Ice-acetone bath. The oxygen-ozone mixture was passed into the reaction flask until the blue coloration of excess ozone appeared in the reaction flask. There was an aqueous (2%) potassium iodide trap directly after the reaction flask and just before a wet test meter. The concentrations of ozone were determined by the oxidation of the potassium iodide solution and then titration with standard sodium thiosulfate solution.

A Welsbach T–23 ozonizer was used as the source of ozone. The conditions were: voltage 110, $O_2$ pressure 6.0 lbs./inch$^2$, flow rate 0.35 l./minute, ozone concentration 0.0030 mole/l. After the reaction was complete, the reaction flask was flushed with oxygen, and the contents were transferred to a flask containing bromobenzene (1.57 g., 0.01 mole). The bromobenzene was used as a convenient high-boiling solvent to minimize loss of product while evaporating the methylene chloride on a steam bath. Also, the bromobenzene does not interfere with analysis of nitrobutane by gas chromatography. The methylene chloride was partly evaporated on a steam cone, and then the product was dried over anhydrous magnesium sulfate. This solution was analyzed by gas chromatography. The yield and conversion to 1-nitrobutane was 12–15%. The peak assumed to be 1-nitrobutane was collected. Its infrared absorption spectrum (1545 cm.$^{-1}$), gas chromatography retention time, and refractive index ($n_D^{20}$ 1.4113) were identical to those of an authentic sample of 1-nitrobutane.

1-nitrobutane is used as a pigment wetting agent in grinding hydrophilic pigments for use in paints, enamels and inks.

Examples 2–11

The experiment of Example 1 was repeated using different conditions, as per the following:

| Example | Solvent | Temp., ° C. | Mole Equiv. of Ozone | Yield $RNO^2$, Percent |
|---|---|---|---|---|
| 2 | Methylene chloride | −5 | 4 | 8–10 |
| 3 | do | −78 | 4 | 12–15 |
| 4 | do | −78 | 3.88 | 8.43 |
| 5 | do | −78 | | 20 |
| 6 | None | −50 | | 14.7 |
| 7 | Ethyl acetate | −78 | 3.54 | 11.6 |
| 8 | Chloroform | −78 | 3.00 | 10 |
| 9 | Carbon tetrachloride | −78 | 3.00 | 8 |
| 10 | Methanol | −78 | 5.40 | 7 |
| 11 | Pet. ether (35–37°) | −78 | 2.77 | 9 |

Example 12.—Preparation of 1-nitrobutane from n-butylamine

The experiment of Example 1 was repeated except that n-butylamine 5 g. (0.0685 mole) was used as the starting material. The Welsbach T–23 ozonizer conditions were: voltage 110, $O_2$ pressure 7.50 lbs./inch$^2$, flow rate 0.45 l./minute, and ozone concentration 0.0033 mole/l. n-Butylamine (5 g., 0.0685 mole) was added to anhydrous methylene chloride (50 g.), and the solution was placed in the reaction flask. The temperature was maintained at −78° C. by a Dry Ice-acetone bath. The oxygen-ozone mixture was passed into the reaction flask until the blue coloration of excess ozone appeared. The reaction flask was flushed with oxygen, and the liquid contents added to a flask containing bromobenzene (1.57 g., 0.01 mole). The methylene chloride was partly evaporated on a steam cone, the liquid residue was dried over anhydrous magnesium sulfate and then analyzed by gas chromatography. The yield of 1-nitrobutane was 19.4%. The 1-nitrobutane was identified by gas chromatography, refractive index ($n_D^{20}$=1.4114) and infrared absorption spectrum (1545 cm.$^{-1}$). These data compare quite well with those of an authentic sample.

Examples 13 to 31

The experiment of Example 12 was repeated using different conditions, as per the following:

| Example | Solvent | Temp., C.° | Mole Equiv. of Ozone | Yield RNO$_2$, percent |
|---|---|---|---|---|
| 13 | Methylene chloride | −78 | (¹) | 25.2 |
| 14 | do | −78 | 3.10 | 18–19 |
| 15 | do | −78 | 2.80 | 22 |
| 16 | do | −78 | 2.52 | 26.3 |
| 17 | do | −65 | 2.25 | 20 |
| 18 | do | −50 | (¹) | 6–8 |
| 19 | do | −50 | 3.00 | 18 |
| 20 | do | −50 | 3.00 | 23 |
| 21 | do | −50 | 2.00 | 18 |
| 22 | do | −50 | 1.00 | 8 |
| 23 | do | −40 | 2.95 | 16–18 |
| 24 | do | −10 | 3.05 | 12–15 |
| 25 | do | 0 | (¹) | 10–12 |
| 26 | do | 0 | 3.34 | 17 |
| 27 ² | do | 45 | (¹) | 9–10 |
| 28 | Ethyl ether | −20 | 5.00 | 13.5 |
| 29 | do | −78 | (¹) | 20 |
| 30 | CH₃CN | −65 | 3.60 | 16.5 |
| 31 | Pyridine | −30 | 2.50 | 8–10 |

¹ Excess.
² Reflux condenser used.

In Example 13 the silica gel transfer method was used for adding ozone. Silica gel (15 g.) was placed in a U-tube in a Dry Ice-acetone bath at −78° C. The oxygen-ozone mixture was passed into the U-tube until the silica gel became dark blue. The U-tube was then warmed slowly and nitrogen passed over the silica gel. The nitrogen-ozone mixture was passed into a solution of n-butylamine and methylene chloride at −78° C. A slight green coloration was observed during this addition. This procedure was repeated until the solution was dark blue with excess ozone. The yield of 1-nitrobutane was 25.4% in this run, which showed that ozone was the reactive species and that the color of the nitrosoalkane intermediate can be observed if a high concentration of ozone is used.

Examples 32–34.—Preparation of 2-nitrooctane

The experiment of Example 12 was repeated except that 2-amino-octane was used as the starting amine. Methylene chloride was again used as the solvent. The secondary carbinamine gave equally as good results as the primary carbinamine.

| Example | Temp., ° | Mole Equiv. of Ozone | Yield RNO$_2$ |
|---|---|---|---|
| 32 | −20 | 3.28 | 20% 2-nitrooctane. 14% 2-octanone. |
| 33 | −78 | 3.25 | 26% 2-nitrooctane. 4% 2-octanone. |
| 34 | −78 | 2.82 | 23.2% 2-nitrooctane. 5.24% 2-octanone. |

The reaction product was added to o-nitrotoluene (1.37 g., 0.01 mole). The solvent was partly evaporated, and the product was dried over anhydrous magnesium sulfate. Gas chromatographic analysis showed 2-octanone (14%, $n_D^{20}$=1.4175, infrared absorption peak at 1712 cm.$^{-1}$) and 2-nitrooctane (20%, $n_D^{20}$=1.4290, infrared absorption peak at 1552 cm.$^{-1}$). These values were all identical with those of a corresponding authentic sample.

Examples 35–45.—Preparation of t-nitrobutane

The experiment of Example 12 was repeated except that t-butylamine was used as the starting amine.

| Example | Solvent | Temp., ° | Mole Equiv. of Ozone | Yield RNO$_2$ Percent |
|---|---|---|---|---|
| 35 | Methylene cloride | −78 | (¹) | 33.4 |
| 36 | do | −78 | 2.40 | 28 |
| 37 | do | −78 | 1.85 | 29.2 |
| 38 | Ethyl ether | −78 | (¹) | 29.0 |
| 39 | do | −78 | (¹) | 28 |
| 40 | do | −78 | (¹) | 12.5 |
| 41 | do | −78 | 1.00 | 6.5 |
| 42 | Methanol | −78 | 2.68 | 15 |
| 43 | Water | 0 | (¹) | 14.2 |
| 44 | Ethyl acetate | −78 | 2.58 | 31.8 |
| 45 | Pet. ether (60–70°) | −78 | (¹) | 34.8 |

¹ Excess.

The reaction product in each case was added to bromobenzene (0.01 mole) and the mixture was then partly evaporated and dried. Gas chromatography showed 2-nitro-2-methylpropane (30% conversion, $n_D^{20}$=1.4020; infrared absorption peaks at 1557 and 860 cm.$^{-1}$) as the only volatile product.

A blue coloration was observed during most of the ozonations.

Example 46.—Preparation of t-nitrooctane

The experiment of Example 12 was repeated except that t-octylamine (2-amino-2,4,4-trimethylpentane) was used as the starting material. A 53% yield of t-nitrooctane was obtained.

Example 47.—Preparation of 2-nitro-1-butanol

The experiment of Example 12 was repeated except that 2-amino-1-butanol was used as the starting material. The ozonation of 2-amino-1-butanol was carried out to determine the influence of other functional groups, in this case the hydroxyl group. The freshly distilled amine, 5 g. (0.0561 mole), was added to anhydrous methylene chloride, 35 g. at −78°, and ozone was added. A light green coloration was observed during addition of the first three liters of oxygen-ozone mixture. The yields of 2-nitro-1-butanol ranged from 11–14.4% for three runs. This was about one-half the yield found for the ozonation of the other secondary carbinamine, 2-aminooctane. This may have been partly due to the hydroxyl group, which could also have reacted with the ozone.

Example 48.—Preparation of nitrobenzene

The experiment of Example 12 was repeated except that aniline was used as the starting material. A solution of aniline 2 g. (0.0215 mole) in methylene chloride, 40 g. was ozonized. After 2.78 mole equivalents of ozone had been added, the reaction product was added to a flask containing o-nitrotoluene (0.005 mole). Gas chromatographic analysis showed nitrobenzene (16.4%, $n_D^{20}$=1.5208, infrared absorption spectrum identical to authentic sample) as the only product.

Example 49.—Preparation of o-nitrotoluene

The experiment of Example 12 is repeated except that o-toluidine, 0.02 mole, is used in place of n-butylamine. Nitrotoluene is thereby produced.

Example 50.—Preparation of o-nitroxylene

The experiment of Example 12 is repeated except that p-xylidine, 0.02 mole, is used in place of n-butylamine. o-Nitroxylene is thereby produced.

Example 51.—Preparation of α-nitronaphthalene

The experiment of Example 12 is repeated except that α-naphthylamine, 0.02 mole, is used in place of n-butylamine. α-Nitronaphthalene is thereby produced.

Example 52.—Preparation of 2-nitropropane

N-isopropyl hydroxylammonium oxalate, 2 g. (0.0123 mole) was added to water, 7 g. and 30 g. methylene chloride was layered on the water. Sodium carbonate was added slowly with stirring until the aqueous layer was determined to be alkaline. Anhydrous magnesium sulfate was then added to dry the methylene chloride layer containing N-isopropyl hydroxylamine, which was thereupon separated.

The methylene chloride layer containing the N-isopropyl hydroxylamine was placed in the reaction vessel and was oxidized with 0.215 mole of ozone according to the procedure of Experiment 12. 2-nitropropane in 40% yield was thereby produced.

Having described this invention, what is claimed is:

1. A process for the production of a nitrohydrocarbon comprising reacting ozone with an organic nitrogen compound corresponding to the formula

wherein R is alkyl, hydroxyalkyl, aryl including substituted aryl or aralkyl, having from 1 to 22 carbon atoms; $R^1$ and $R^2$ are hydrogen, or $R^2$ is hydroxyl; or $R^1$ and $R^2$ taken together represents the radical

wherein $R^3$ is an alkyl group of from 1 to 21 carbon atoms.

2. The process of claim 1 wherein the temperature is within the range of from about −78° C. to about 45° C.

3. The process of claim 1 wherein the ratio of ozone to organic nitrogen compound is within the range of from at least 1 to about 5 moles of ozone per mole of said organic nitrogen compound.

4. A process for the production of a nitrohydrocarbon comprising reacting ozone with a primary amine in a mole ratio of from 1 to about 5 moles of ozone to 1 mole of amine and recovering said nitrohydrocarbon.

5. The process of claim 4 for the production of a nitrohydrocarbon wherein the primary amine is an aliphatic primary amine having from 1 to about 22 carbon atoms.

6. The process of claim 4 for the production of nitrobenzene wherein the primary amine is aniline.

7. The process of claim 4 for the production of 1-nitrobutane wherein the primary amine is n-butylamine.

8. The process of claim 4 for the production of 2-nitrooctane wherein the primary amine is 2-aminooctane.

9. The process of claim 4 for the production of t-nitrobutane wherein the primary amine is t-butylamine.

10. The process of claim 4 for the production of t-nitrooctane wherein the primary amine is t-aminooctane.

11. The process of claim 4 for the production of 2-nitro-1-butanol wherein the primary amine is 2-amino-1-butanol.

12. The process of claim 1 wherein the organic nitrogen compound is an alkyl or aryl hydroxylamine having from 1 to 22 carbon atoms.

13. The process of claim 12 wherein the organic nitrogen compound is N-isopropyl hydroxylamine.

14. The process of claim 1 wherein the organic nitrogen compound is a ketimine corresponding to the formula

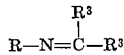

wherein R is alkyl, hydroxyalkyl, aryl including substituted aryl, or aralkyl, having from 1 to 22 carbon atoms, and $R^3$ is an alkyl group of from 1 to 21 carbon atoms.

15. The process of claim 14 wherein the ketimine is N-isopropylidenebutylamine.

References Cited

UNITED STATES PATENTS 3,211,785  10/1965  Kilroy et al. _____ 260—664 X
3,267,158   8/1966  Havlik _____ 260—644

L. DEWAYNE RUTLEDGE, *Primary Examiner.*

L. A. SEBASTIAN, *Assistant Examiner.*